US009827457B2

(12) United States Patent
Gan et al.

(10) Patent No.: US 9,827,457 B2
(45) Date of Patent: Nov. 28, 2017

(54) COMPOSITIONS AND METHODS FOR CONVERTING HAZARDOUS WASTE GLASS INTO NON-HAZARDOUS PRODUCTS

(71) Applicant: The Catholic University of America, Washington, DC (US)

(72) Inventors: Hao Gan, Gaithersburg, MD (US); Malabika Chaudhuri, Silver Spring, MD (US); Biprodas Dutta, Silver Spring, MD (US); Ian L. Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 0 days.

(21) Appl. No.: 14/078,723

(22) Filed: Nov. 13, 2013

(65) Prior Publication Data
US 2014/0073830 A1    Mar. 13, 2014

Related U.S. Application Data

(62) Division of application No. 13/095,540, filed on Apr. 27, 2011, now abandoned.
(Continued)

(51) Int. Cl.
C04B 18/04 (2006.01)
A62D 3/33 (2007.01)
(Continued)

(52) U.S. Cl.
CPC ............... *A62D 3/33* (2013.01); *C03C 1/002* (2013.01); *C03C 14/00* (2013.01); *C04B 33/13* (2013.01); *C04B 33/1325* (2013.01); *C04B 33/20* (2013.01); *C04B 33/30* (2013.01); *C04B 33/34* (2013.01); *C04B 35/117* (2013.01); *C04B 35/20* (2013.01); *C04B 35/62204* (2013.01); *C04B 35/62695* (2013.01); *C04B 35/63416* (2013.01);
(Continued)

(58) Field of Classification Search
CPC .................... C04B 18/0463; C04B 18/0472
USPC ............................................. 264/667
See application file for complete search history.

(56) References Cited

U.S. PATENT DOCUMENTS 3,941,604 A * 3/1976 Boyce ...................... 501/144
3,942,966 A   3/1976 Kroyer et al.
(Continued)

FOREIGN PATENT DOCUMENTS

JP    2003-212594    7/2003
JP    2005-089274    4/2005
KR    2003047501    6/2003

OTHER PUBLICATIONS

Creating Markets for Recycled Resources—Materials Recovery from Waste Cathode Ray Tubes (Project Code GLA15-006), written by ICER, published by the Waste & Resources Action Programme, Nov. 2003.
(Continued)

*Primary Examiner* — Erin Snelting
(74) *Attorney, Agent, or Firm* — Foley & Lardner LLP

(57) ABSTRACT

The present invention provides compositions and methods for converting hazardous waste glass into safe and usable material. In particular, the present invention provides compositions and methods for producing ceramic products from toxic-metal-containing waste glass, thereby safely encapsulating the metals and other hazardous components within the ceramic products.

17 Claims, 8 Drawing Sheets

Flow sheet for lab-scale fabrication process for ceramic tile utilizing CRT glass.

Related U.S. Application Data

(60) Provisional application No. 61/328,845, filed on Apr. 28, 2010.

(51) Int. Cl.

| | | |
|---|---|---|
| *C03C 14/00* | (2006.01) | |
| *C04B 33/13* | (2006.01) | |
| *C04B 33/132* | (2006.01) | |
| *C04B 33/20* | (2006.01) | |
| *C04B 33/30* | (2006.01) | |
| *C04B 33/34* | (2006.01) | |
| *C04B 35/117* | (2006.01) | |
| *C04B 35/20* | (2006.01) | |
| *C04B 35/622* | (2006.01) | |
| *C04B 35/626* | (2006.01) | |
| *C04B 35/634* | (2006.01) | |
| *C03C 1/00* | (2006.01) | |

(52) U.S. Cl.
CPC .......... *C04B 2235/3217* (2013.01); *C04B 2235/349* (2013.01); *C04B 2235/3427* (2013.01); *C04B 2235/36* (2013.01); *C04B 2235/604* (2013.01); *C04B 2235/72* (2013.01); *C04B 2235/77* (2013.01); *C04B 2235/9615* (2013.01); *C04B 2235/9638* (2013.01); *Y02P 40/69* (2015.11)

(56) References Cited

U.S. PATENT DOCUMENTS

| | | | |
|---|---|---|---|
| 3,963,506 A * | 6/1976 | Shutt et al. ............... 501/131 |
| 4,777,092 A | 10/1988 | Kawakami et al. |
| 4,826,788 A | 5/1989 | Dennert et al. |
| 5,043,223 A | 8/1991 | Kumagai et al. |
| 5,536,345 A | 7/1996 | Lingart |
| 5,583,079 A | 12/1996 | Golitz et al. |
| 5,649,987 A * | 7/1997 | Greulich ................. 65/17.5 |
| 5,674,616 A * | 10/1997 | Balcar ..................... 428/402 |
| 5,792,524 A | 8/1998 | Lingart et al. |
| 5,810,921 A | 9/1998 | Baxter et al. |
| 5,830,251 A | 11/1998 | Simpson et al. |
| 5,895,511 A | 4/1999 | Tikhonova |
| 6,042,905 A | 3/2000 | Lingart et al. |
| 6,284,186 B1 | 9/2001 | Hansen |
| 6,296,699 B1 | 10/2001 | Jin |
| 6,340,650 B1 * | 1/2002 | Haun ..................... 501/155 |
| 6,488,762 B1 | 12/2002 | Shi |
| 6,710,001 B2 | 3/2004 | Watanabe et al. |
| 7,169,725 B2 | 1/2007 | Haun |
| 2003/0150360 A1 * | 8/2003 | Huntsman et al. ........ 106/672 |

OTHER PUBLICATIONS

"GW-12.10-130: New Approach to Cathode Ray Tube (CRT) Recycling," Industry Council for Electronic Equipment Recycling; Prepared for the Department of Trade and Industry, (UK), Aug. 2003.

"Standard Test Method for Water Absorption, Bulk Density, Apparent Porosity, and Apparent Specific Gravity of Fired Whiteware Products," ASTM C373-88 (reapproved 1999), 2 pages.

"Testing of Recycled Glass and Inorganic Binder Paving Tiles—Final Report" Report No. GL-99-2, University of Washington, May 1999.

Daniels, Robert E. "State of the U.S. Ceramic Tile Industry," published in newsletter of The Tile Council of America, posted Fall 2001.

Final Office Action on U.S. Appl. No. 13/095,540, dated May 14, 2013.

Non-Final Office Action on U.S. Appl. No. 13/095,540, dated Nov. 19, 2012.

Patricia S. Dillon, "Potential Markets for CRTs and Plastics from Electronics Demanufacturing: An Initial Scoping Report," Chelsea Center for Recycling and Economic Development, University of Massachusetts, Aug. 1998, 25 pages.

Townsend et al., "Characterization of Lead Leachability from Cathode Ray Tubes Using the Toxicity Characteristic Leaching Procedure," Report to Florida Center for Solid and Hazardous Waste Management, State University System of Florida, Dec. 1999.

* cited by examiner

Flow sheet for lab-scale fabrication process for ceramic tile utilizing CRT glass.

COMPOSITIONS AND METHODS FOR CONVERTING HAZARDOUS WASTE GLASS INTO NON-HAZARDOUS PRODUCTS

CROSS-REFERENCE TO RELATED APPLICATION

This application is a divisional of U.S. patent application Ser. No. 13/095,540, filed Apr. 27, 2011. This application also claims priority to U.S. Provisional Patent Application No. 61/328,845, filed Apr. 28, 2010. The contents of both applications are incorporated herein by reference in their entirety.

FIELD OF THE INVENTION

The present invention provides compositions and methods for converting hazardous waste glass into safe and usable material. In particular, the present invention provides compositions and methods for producing ceramic products from toxic-metal-containing waste glass, thereby safely encapsulating metals and other hazardous components within the ceramic products.

BACKGROUND

A cathode ray tube (CRT) is a video display component of many televisions and computer monitors. A typical CRT weighs between 15 and 90 pounds and contains significant quantities of lead, barium, and other elements that are added to the specialized CRT glass, in some cases to protect the user from x-rays generated within the operating CRT. CRT glass is comprised of up to 25% lead oxide (PbO). The major hazardous components of CRTs are lead and barium found in the glass and seal components. The lead content of a typical color CRT is about 2.5 lb. Most of the lead is found in the funnel glass and the face plate-funnel seal since most manufacturers have eliminated lead from the panel glass and the neck glass represents a relatively small part of a typical tube. The glass for the funnel and neck sections are characterized by high levels of lead oxide and the glass for display panel typically contains high levels of barium oxide [2-4].

A major obstacle to reuse and disposal is the fact that the leachability of lead causes the CRT components to fail the EPA TCLP leaching test [5]. Because of the high lead content, CRT glass is no longer to be disposed of in the trash or in municipal landfills. While CRT glass may be disposed of in hazardous waste landfills, this is a costly option and recycling is the preferred management option for end-of-life CRTs. Currently, CRTs are recycled through a process which involves extracting the lead using a smelting process. The smelting process is costly and results in high levels of air and water pollution. Cathode ray tubes presently have a negative value due to the difficulty and hazards associated with recycling and/or disposing of them. Similar difficulties in disposal arise with other glasses containing hazardous materials, such as fluorescent light bulbs.

Methods have been developed for converting waste glass into ceramic products. However, established methods for conversion of waste glass into other useful materials (e.g., ceramics) do not address the hazardous components of CRT glass and other hazardous waste glasses. The field currently lacks suitable techniques for the safe encapsulation of heavy metals and other hazardous compounds into products and/or materials made from CRT glass and other hazardous waste glass.

SUMMARY OF THE INVENTION

Experiments conducted during the course of developing embodiments for the present invention demonstrated production of ceramic products from toxic-metal-containing waste glass, wherein the ceramic products safely encapsulate the metals and other hazardous components. Accordingly, the present invention provides compositions and methods for converting hazardous waste glass into safe and usable material. In particular, the present invention provides compositions and methods for producing ceramic products from toxic-metal-containing waste glass, thereby safely encapsulating metals and other hazardous components within the ceramic products.

In certain embodiments, the present invention provides methods for producing a ceramic article from hazardous waste glass comprising: (a) mixing the hazardous waste glass with a filler and a non-aqueous binder; (b) pressing the mixture to produce a green article; and (c) firing the green article to produce a ceramic article. In some embodiments, the hazardous waste glass comprises greater than 1% lead (e.g., 1.01% Pb, 2% Pb, 3% Pb, 4% Pb, 5% Pb, 10% Pb, 20% Pb, 30% Pb, 40% Pb, 50% Pb, etc.). In some embodiments, the hazardous waste glass comprises greater than 1% barium (e.g., 1.01% Ba, 2% Ba, 3% Ba, 4% Ba, 5% Ba, 10% Ba, 20% Ba, 30% Ba, 40% Ba, 50% Ba, etc.). In some embodiments, the hazardous waste glass comprises CRT glass. In some embodiments, the hazardous waste glass comprises fluorescent light glass. In some embodiments, the filler comprises alumina, magnesium silicate (e.g., Talc), and/or bentonite (e.g., clay). In some embodiments, the choice of filler is dependent upon the ultimate desired use of the ceramic article (e.g., indoor/outdoor use for the ceramic article or use of magnesium silicate as a filler for outdoor ceramic articles as magnesium silicate withstands temperature changes expansion and contraction). In some embodiments, the non-aqueous binder comprises polyvinyl alcohol. In some embodiments, the non-aqueous binder prevents the emission of hydrocarbons during, for example, a firing stage (e.g., where non-aqueous binder is sodium silicate). In some embodiments, pressing comprises dry pressing. In some embodiments, pressing comprises placing the mixture under pressure of at least 200 kg/cm$^2$. In some embodiments, pressing comprises placing the mixture under pressure of about 400 kg/cm$^2$. In some embodiments, firing comprises heating the green article to at least 500° C. In some embodiments, firing comprises heating the green article to a temperature less than 1000° C. In some embodiments, firing comprises heating the green article to at least 650° C. In some embodiments, the firing comprises heating the green article to a temperature less than 815° C.

In certain embodiments, the present invention provides methods of producing ceramic articles from hazardous waste glass comprising: (a) mixing hazardous waste glass with a filler, and a plastic material, (b) mixing the hazardous waste glass, filler, and plastic material mixture with a non-aqueous binder to produce a batch mixture, (c) pressing the batch mixture to produce a green article, (d) drying the green article, and (e) firing the green article to produce a ceramic article. In some embodiments, the hazardous waste glass comprises greater than 1% lead. In some embodiments, the hazardous waste glass comprises CRT glass. In some embodiments, the hazardous waste glass comprises fluorescent light glass. In some embodiments, the filler comprises alumina, magnesium silicate, and/or bentonite. In some embodiments, the plastic material comprises clay. In some embodiments, the non-aqueous binder comprises polyvinyl alcohol or sodium silicate (e.g., so as to prevent the emission of hydrocarbons during, for example, a firing stage). In some embodiments, mixing the hazardous waste glass with the filler and plastic material comprises wet stirring followed by drying. In some embodiments, pressing comprises placing the mixture under pressure of at least 200 kg/cm². In some embodiments, pressing comprises placing the mixture under pressure of about 400 kg/cm². In some embodiments, firing comprises heating the green article to at least 500° C. In some embodiments, firing comprises heating the green article to a temperature less than 1400° C. In some embodiments, firing comprises heating said green article to at least 650° C. In some embodiments, firing comprises heating the green article to a temperature less than 1250° C. In some embodiments, the method further comprises a step between steps (a) and (b) of sieving the batch mixture through a first mesh. In some embodiments, the first mesh comprises a 50-150 mesh. In some embodiments, the method further comprises a step between steps (b) and (c) of sieving the batch mixture through a second mesh. In some embodiments, the second mesh comprises a 10-40 mesh. In some embodiments, the second mesh can comprise about 20 mesh.

In certain embodiments, the present invention provides methods for recycling hazardous waste glass comprising: (a) providing hazardous waste glass as a starting material, and (b) producing a ceramic article from the hazardous waste glass, wherein the ceramic article safely encapsulates the hazardous components of the hazardous waste glass. In some embodiments, the hazardous waste glass comprises significant quantities of toxic and/or heavy metals. In some embodiments, the ceramic article meets EPA standards for toxicity and leaching of toxic and/or heavy metals. In some embodiments, the ceramic article exhibits lead leachate concentrations of less than 5 ppm. In some embodiments, the hazardous waste glass comprises greater than 1% lead. In some embodiments, the hazardous waste glass comprises greater than 5% lead. In some embodiments, the hazardous waste glass comprises greater than 20% lead. In some embodiments, the ceramic article exhibits barium leachate concentrations of less than 100 ppm. In some embodiments, the ceramic article exhibits barium leachate concentrations of less than 10 ppm. In some embodiments, the hazardous waste glass comprises greater than 1% barium. In some embodiments, the hazardous waste glass comprises greater than 5% barium. In some embodiments, the hazardous waste glass comprises greater than 20% barium. In some embodiments, the hazardous waste glass comprises CRT glass. In some embodiments, the hazardous waste glass comprises fluorescent light glass.

In certain embodiments, the present invention provides ceramic articles comprising hazardous waste glass. In some embodiments, the ceramic articles comprise a ceramic tile. In some embodiments, the ceramic tile comprises a floor tile. In some embodiments, the ceramic tile comprises a wall tile. In some embodiments, the hazardous waste glass comprises CRT glass. In some embodiments, the hazardous waste glass comprises fluorescent light glass. In some embodiments, the ceramic article comprises greater than 40% hazardous waste glass. In some embodiments, the ceramic article comprises greater than 60% hazardous waste glass. In some embodiments, the ceramic article comprises greater than 80% hazardous waste glass. In some embodiments, the ceramic article comprises greater than 90% hazardous waste glass. In some embodiments, the ceramic article comprises significant quantities of heavy and/or toxic metals. In some embodiments, the ceramic article meets EPA standards for toxicity and leaching of toxic and/or heavy metals. In some embodiments, the ceramic article exhibits lead leachate concentrations of less than 5 ppm. In some embodiments, the hazardous waste glass comprises greater than 1% lead. In some embodiments, the hazardous waste glass comprises greater than 5% lead. In some embodiments, the hazardous waste glass comprises greater than 20% lead. In some embodiments, the ceramic article exhibits barium leachate concentrations of less than 100 ppm. In some embodiments, the ceramic article exhibits barium leachate concentrations of less than 10 ppm. In some embodiments, the hazardous waste glass comprises greater than 1% barium. In some embodiments, the hazardous waste glass comprises greater than 5% barium. In some embodiments, the hazardous waste glass comprises greater than 20% barium.

DEFINITIONS

Figure 1:
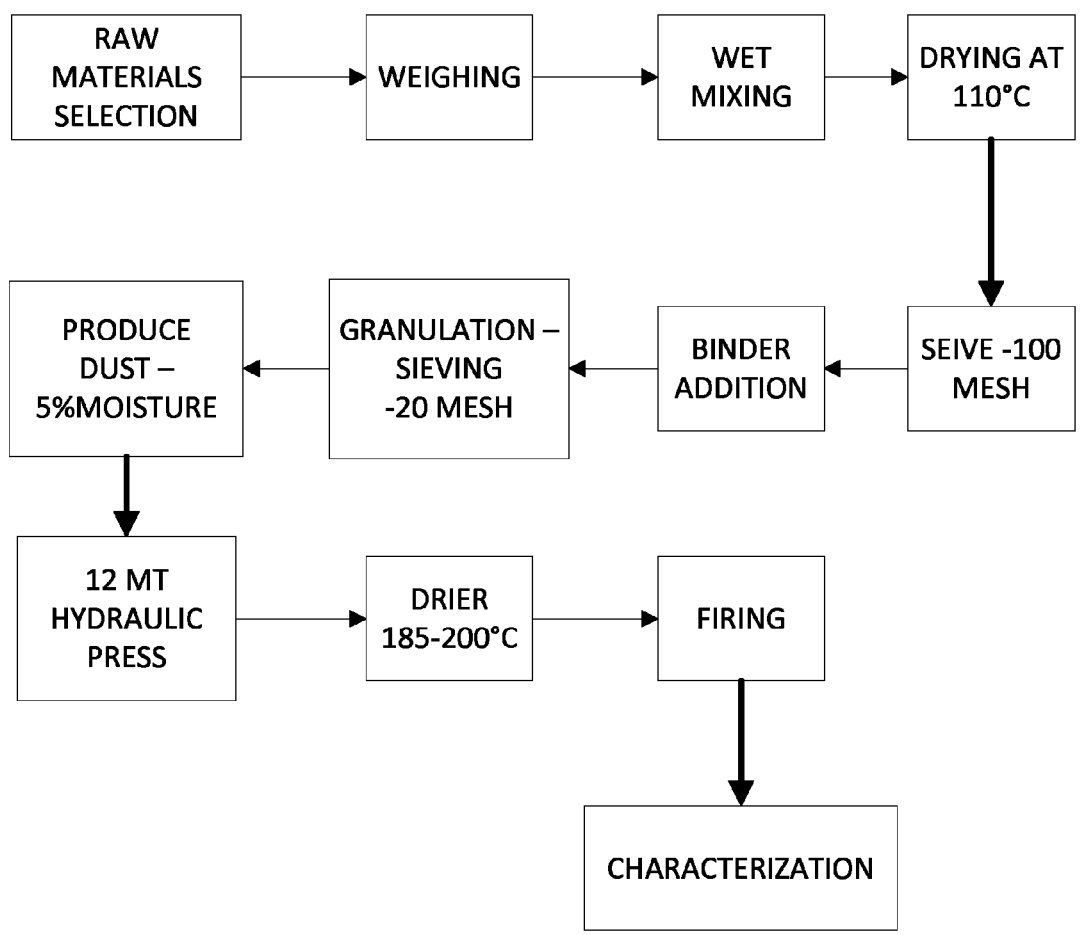
FIG. 1 shows a lab-scale fabrication process for ceramic tile utilizing CRT glass.

To facilitate an understanding of the present invention, a number of terms and phrases are defined below:

As used herein, the term "waste glass" refers to any unwanted or unusable glass products or materials including post-consumer glass, industrial waste glass, production defect glass, and/or byproduct glass. "Waste glass" may comprise any level of hazardous materials, including being devoid of any hazardous materials, as in "non-hazardous waste glass."

As used herein, the term "hazardous waste glass" refers to waste glass which contains hazardous materials (e.g., heavy metals, toxic metals, etc.) as a component of the glass. Disposal of "hazardous waste glass" is complicated by the need to safely and efficiently deal with the hazardous materials within the glass.

As used herein, the term "heavy metals" refers to the subset of elements that exhibit metallic properties, which would mainly include the transition metals and some metalloids. As used herein, the term "heavy metals" generally refers to a subset of elements which have been deemed harmful, hazardous, polluting, or dangerous to health or the environment. "Heavy metals" include mercury, arsenic, cadmium, cobalt, chromium, copper, manganese, nickel, lead, tin and thallium. Some "heavy metals" are actually necessary for humans in minute amounts (Co, Cu, Cr, Ni), while others are carcinogenic or toxic, affecting, among others, the central nervous system (Hg, Pb, As); the kidneys or liver (Hg, Pb, Cd, Cu); or skin, bones, or teeth (Ni, Cd, Cu, Cr).

As used herein, the term "toxic metal" refers to metal elements that form poisonous soluble compounds and either have no biological role (e.g., are not essential minerals), are in the wrong form, or are present in an abnormally high, toxic doses. "Toxic metals" include: antimony, barium, beryllium, aluminum, cadmium, lead, mercury, osmium, thallium, and vanadium. As used herein, the term "starting material," also known as "input material," refers to materials and components used to produce ceramic products and/or materials. Starting materials include, for example flux (e.g., hazardous waste glass (e.g., CRT glass, fluorescent glass, etc.)), filler (e.g., alumina, magnesium silicate, and/or bentonite), and plastic material (e.g., clay). Starting materials may be in a raw or unmanipulated form (e.g., glass within a CRT), or in a processed form (e.g., ground and sieved CRT glass).

As used herein, the term "raw material" refers to a starting material in an unmanipulated or unrefined form. "Raw material" may be ready for use in methods of the present invention or may require one or more pre-processing steps. For example, hazardous waste glass is a "raw material" that may require grinding or removal of additional parts prior to use in methods of the present invention. Pre-processing of "raw materials" is within the scope of the methods of the present invention, but is not a required element.

As used herein, the term "batch mixture" refers to a mixture of starting materials being processed according to methods of the present invention. "Batch mixture" refers to materials during any step of processing following mixing of starting materials and prior to the finished product. For example, "batch mixture" may comprise flux (e.g., hazardous waste glass (e.g., CRT glass, fluorescent glass, etc.)), filler (e.g., alumina, magnesium silicate, and/or bentonite), and plastic material (e.g., clay); flux (e.g., hazardous waste glass (e.g., CRT glass, fluorescent glass, etc.)), filler (e.g., alumina, magnesium silicate, and/or bentonite), plastic material (e.g., clay), and binder (e.g., polyvinyl alcohol or sodium silicate); flux (e.g., hazardous waste glass (e.g., CRT glass, fluorescent glass, etc.)) and filler (e.g., alumina, magnesium silicate, and/or bentonite); or flux (e.g., hazardous waste glass (e.g., CRT glass, fluorescent glass, etc.)), filler (e.g., alumina, magnesium silicate, and/or bentonite), and binder (e.g., polyvinyl alcohol and/or sodium silicate).

As used herein, the term "green article" refers to an article in an unfired or pre-fired state. A "green article" may comprise a green material and/or a green product. A batch mixture which has been mixed, but not yet fired is referred to as a "green article." A "green article" typically refers to an article which has undergone most or all processing steps, short of firing.

As used herein, the term "plastic" refers to a material that is malleable or capable of being shaped and formed (e.g., clay). A "plastic" material may be of natural or synthetic origins, and does not necessarily refer to a synthetic or semisynthetic organic polymer material.

DETAILED DESCRIPTION OF THE INVENTION

Experiments conducted during the course of developing embodiments for the present invention demonstrated production of ceramic products from toxic-metal-containing waste glass, wherein the ceramic produces safely encapsulate the metals and other hazardous components.

Accordingly, the present invention provides compositions, devices, systems, and methods for recycling hazardous waste glass (e.g., heavy metal-containing glass (e.g., lead, barium, etc.)). In particular, the compositions, devices, systems and methods of the present invention convert hazardous waste glass into a material which safely encapsulates hazardous components (e.g., heavy metals, toxic metals, etc.) of the waste glass within a new material (e.g., ceramic end product). The present invention is not limited to the generation of a particular non-hazardous material through recycling of hazardous waste glass. In some embodiments, the non-hazardous material is a ceramic product. The present invention is not limited to a particular type of ceramic product. In some embodiments, the present invention provides compositions and methods for the production of ceramic tiles from hazardous waste glass. In some embodiments, the present invention provides compositions and methods for the production of ceramic tiles from CRT glass and/or fluorescent light glass. Indeed, in some embodiments, the present invention provides ceramic materials and/or products (e.g., ceramic tiles) produced using hazardous waste glass (e.g., CRT glass, fluorescent light glass, etc.) as an input material.

The present invention is not limited to particular compositions, devices, systems, and/or methods for accomplishing such recycling of hazardous waste glass into a non-hazardous material. For example, the compositions, systems, devices and methods recycle hazardous waste glass such that the inherent hazardous materials are safely encapsulated within a material (e.g., a ceramic end product) incapable of leaching into the surrounding environment (e.g., air, water, skin, etc.). As noted, in some embodiments, the present invention provides compositions and methods for transforming hazardous and/or potentially hazardous waste glass into ceramic products (e.g., ceramic tiles) and/or ceramic material safely encapsulating the hazardous materials (e.g., lead, mercury, barium, etc.) within the hazardous waste glass (e.g., the hazardous materials are incapable of leaching from ceramic and/or leach below an acceptable threshold of leachability, etc.). In some embodiments, materials and products of the present invention generate end products (e.g., ceramic products) that encapsulate and/or are configured to prevent leaching of hazardous materials (e.g., heavy metals, toxic metals, etc.) that would otherwise have to be removed prior to recycling or disposal. As such, the present invention provides a significant improvement over existing recycling technologies rendering end products having unacceptable hazardous waste content.

Accordingly, the present invention provides compositions and methods for converting hazardous waste glass into safe and usable material. In particular, the present invention provides compositions and methods for producing ceramic products from toxic-metal-containing waste glass, thereby safely encapsulating the metals and other hazardous components within the ceramic products.

The present invention is not limited to particular methods for recycling hazardous waste glass (e.g., CRT glass, fluorescent light glass, etc.), encapsulating hazardous materials (e.g., heavy metals, toxic metals, etc.), and/or producing ceramic materials and/or products. In some embodiments, the methods produce ceramic materials and/or products encapsulating hazardous materials (e.g., heavy metals, toxic metals, etc.) and prevent leaching thereof, comprising, for example, mixing input materials (e.g., flux material (e.g., hazardous waste glass), filler, binder, plastic material), pressing the mixed input materials, and firing the pressed mixed input materials to generate a ceramic product that encapsulates hazardous materials.

The present invention is not limited to particular input materials used in methods for producing ceramic product that encapsulates hazardous materials from hazardous waste glass. Examples of input materials include, but are not limited to, flux material (e.g., hazardous waste glass (e.g., CRT glass, fluorescent light glass, etc.)), filler (e.g., alumina, magnesium silicate, and/or bentonite), binder (e.g., polyvinyl alcohol or sodium silicate) and plastic material (e.g., clay). In some embodiments, the methods use more than one type of input material (e.g., flux material and binder; flux material and filler; flux material, binder, filler and plastic material).

The present invention is not limited to a particular type and/or kind of flux material. In some embodiments, the flux material comprises hazardous waste glass. The present invention is not limited to particular types of hazardous waste glass. Examples of hazardous waste glass include, but are not limited to, CRT glass, fluorescent light glass, and/or other hazardous waste glass (e.g., glass containing quantities of toxic metals, heavy metals, etc.).

In some embodiments, hazardous waste glass comprises significant quantities of toxic metals, heavy metals, and/or other hazardous compounds. In some embodiments, hazardous waste glass comprises significant quantities of one or more of antimony, barium, beryllium, aluminum, cadmium, lead, mercury, osmium, thallium, and vanadium. In some embodiments, hazardous waste glass comprises greater than 0.1% lead (e.g., PbO) by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% barium (e.g., BaO) by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% mercury by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% silver by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% selenium by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% toxic metals by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%). In some embodiments, hazardous waste glass comprises greater than 0.1% heavy metals by weight % (e.g., 0.2% . . . 0.5% . . . 1.0% . . . 2% . . . 5% . . . 10% . . . 15% . . . 20% . . . 25% . . . 30% . . . 40% . . . 50% . . . 60% . . . 75% . . . 90% . . . >95%).

The methods of the present invention do not require the hazardous waste glass to be in a particular form when used as an input material. In some embodiments, hazardous waste glass is used in a granular or powder form. Different powder or grain size can be achieved through various grinding and sieving techniques understood in the art. The glass powder particle size required depends on the final properties desired.

In some embodiments, various types of equipment are used to reduce the particle size and/or create a powder (e.g., hammer mills, roller mills, and rotating pan mixers with Muller-type wheels, etc.). Indeed, any type of milling and/or grinding equipment that crushes the agglomerate into a powder can be used for this step. In some embodiments, after crushing, the material is sieved to produce a more uniformly sized flowable powder and/or granulate. Various mesh size sieves (e.g., 10 mesh, 20 mesh, 30 mesh, 40 mesh, 50 mesh, 100 mesh, 200 mesh, 400 mesh, 600 mesh, 800 mesh, etc.) can be used depending on the powder size desired for the forming process. Particles that do not pass through the sieve can be circulated back to the crushing and/or grinding step.

The present invention is not limited to particular types and/or kinds of CRT glass. In some embodiments, CRT glass includes, but is not limited to, panel glass, funnel glass, neck glass, and solders glass. Panel glass or screen glass makes up, for example, the front of the CRT and generally accounts for approximately two-thirds of the CRT mass. Panel glass typically contains low concentrations of lead. The funnel is the rear portion of the CRT. The funnel is fabricated from leaded glass containing up to 28 wt % lead oxide. Most of the lead in the CRT is contained in the funnel. The neck is the straight glass tube that surrounds the electron gun. The neck is also made from leaded glass. Solder glass is used to connect and seal the panel glass to the funnel. The solder glass typically contains concentrations well over 50 wt % lead oxide. A typical CRT contains between 2 and 20 pounds of lead. Due to the high leaching rate of lead from the CRTs, the Environmental Protection Agency (EPA) has classified CRTs as hazardous waste when discarded. The methods of the present invention permit processing CRT glass (e.g., panel glass, funnel glass, neck glass, and solder glass) into ceramic materials and/or products that encapsulate such hazardous materials in a safe and non-leaching manner. In some embodiments, the methods of the present invention permit processing of CRT glass without a need to separate out or discard different regions of the CRT glass (e.g., batch processing).

The present invention is not limited to a particular type of fluorescent light glass. In some embodiments, fluorescent light glass includes, but is not limited to, fluorescent light bulbs, fluorescent tubes, compact fluorescent lamps, etc. In some embodiments, fluorescent light glass comprises mercury. In some embodiments, fluorescent light glass comprises mercury and other toxic and/or heavy metals.

In some embodiments, additional materials (e.g., feldspar) are used as flux materials. For example, in some embodiments, the flux material comprises hazardous waste glass and any other suitable flux materials. In some embodiments, additional flux materials include, but are not limited to, feldspar, ammonium chloride, rosin, zinc chloride, borax, and alkali metal fluxes (e.g., sodium fluoride, potassium fluoride, etc.).

The present invention is not limited to particular types and/or kinds of plastic material. In some embodiments, plastic material is clay. Indeed, any suitable clay material finds use as an input material in the present invention. In some embodiments, clay is selected as a plastic material based on the other input materials (e.g., binder, filler, flux, etc.). In some embodiments, clay is selected as an input material based on the reaction conditions of the methods. In some embodiments, clay is selected as an input material based on the desired characteristics of the ceramic product and/or material. Examples of suitable types and/or forms of clays include, but are not limited to, bentonite (e.g., sodium bentonite, calcium bentonite, potassium bentonite, etc.), kaolinite, smectite (e.g., montmorillonite-smectite), illite, chlorite, derivatives thereof, and combinations thereof.

The present invention is not limited to particular types and/or kinds of filler. Examples of filler include, but are not limited to, alumina, silica, zirconia titania, ceria, mullite, and silicon carbide. In some embodiments, a filler is selected based on the other input materials (e.g., binder, plastic material, flux, etc.). In some embodiments, a filler is selected as an input material based on the reaction conditions. In some embodiments, a filler is selected as an input material based on the desired characteristics of the ceramic product and/or material. In some embodiments, the filler comprises alumina, magnesium silicate (e.g., Talc), and/or bentonite (e.g., clay). In some embodiments, the choice of filler is dependent upon the ultimate desired use of the ceramic article (e.g., indoor/outdoor use for the ceramic article) (e.g., use of magnesium silicate as a filler for outdoor ceramic articles as magnesium silicate withstands temperature changes expansion and contraction The present invention is not limited to particular types and/or kinds of binders. In some embodiments, a binder comprises an alcohol (e.g., polyvinyl alcohol). In some embodiments, a binder comprises a non-aqueous liquid. Use of a non-aqueous binder in the methods of the present invention for generating ceramic products that encapsulate hazardous materials from, for example, hazardous waste glass alleviates the need for drying steps within such methods. In some embodiments, binder selection (e.g., selection of a non-aqueous binder, selection of polyvinyl alcohol as binder) is a key to generating ceramic articles which safely encapsulate hazardous materials (e.g., lead, barium, etc.). In some embodiments, binder selection (e.g., selection of a non-aqueous binder, selection of polyvinyl alcohol as binder) permits efficient, low temperature, environmentally friendly processing of hazardous waste glass (e.g., CRT glass, fluorescent light glass, etc.). In some embodiments, the non-aqueous binder is sodium silicate. In some embodiments, the non-aqueous binder prevents the emission of hydrocarbons during, for example, a firing stage (e.g., where non-aqueous binder is sodium silicate).

In some embodiments, various additives are added to the input materials to yield a desired material and/or product (e.g., added strength, color, texture, etc.), or to have a desired effect on the process (e.g., lower heat, lower pressure, etc.). Common ceramic additives, such as plasticizers, lubricants, colorants, etc. can also be added with the input materials. In some embodiments, coarse sized particles are added to adjust properties, such as improving slip resistance by roughing the surface texture. In some embodiments, addition of any mixtures or compounds commonly used in the manufacture of ceramic articles, materials, and/or products (e.g., ceramic tiles) is within the scope of the present invention.

The methods are not limited to particular percentages of input materials. Indeed, in some embodiments, flux material (e.g., hazardous waste glass (e.g., CRT glass, fluorescent light glass, etc.)) comprises 25-99% of the input materials by weight % (e.g., 25% . . . 35% . . . 45% . . . 55% . . . 65% . . . 75% . . . 85% . . . 95% . . . 99%). In some embodiments, flux material (e.g., hazardous waste glass (e.g., CRT glass, fluorescent light glass, etc.)) comprises at least about 25% of the input materials by weight % (e.g., >25%, >35%, >45%, >55%, >65%, >75%, >85%, >95%, etc.). In some embodiments, flux material (e.g., hazardous waste glass (e.g., CRT glass, fluorescent light glass, etc.)) comprises less than about 99% of the input materials by weight % (e.g., <99%, <95%, <85%, <75%, <65%, <55%, <45%, <35%, etc.). In some embodiments, a plastic material (e.g., clay) comprises 5-40% of the input material by weight % (e.g., 5% . . . 10% . . . 15% . . . 25% . . . 35% . . . 40%). In some embodiments, a plastic material (e.g., clay) comprises at least about 5% of the input material by weight % (e.g., >5%, >10%, >15%, >20%, >25%, >30%, >35%, etc.). In some embodiments, a plastic material (e.g., clay) comprises less than about 40% of the input material by weight % (e.g., <40%, <35%, <30%, <25%, <20%, <15%, <10%, etc.). In some embodiments, a binder (e.g., polyvinyl alcohol or sodium silicate) comprises 0.1-5% of the input material by weight % (e.g., 0.1% . . . 0.2% . . . 0.5% . . . 1% . . . 2% . . . 3% . . . 4% . . . 5%). In some embodiments, methods of the present invention utilize 40-80% flux material (e.g., hazardous waste glass (e.g., CRT glass)) by wt % of input material. In some embodiments, methods of the present invention utilize 5-40% filler (e.g., alumina) by wt % of input material. In some embodiments, methods of the present invention utilize 10-25% plastic material (e.g., clay) by wt % of input material. In some embodiments, suitable ratios of input materials are provided in Table 3. In some embodiments, methods of the present invention utilize 75-99% (e.g., 85-95%) flux material (e.g., hazardous waste glass (e.g., CRT glass)) by wt % of input material. In some embodiments, methods of the present invention utilize 1-25% (e.g., 5-15%) filler (e.g., alumina) by wt % of input material.

In some embodiments, the input materials are crushed and/or ground to achieve a desired particulate size or fineness of powder. In some embodiments, material is sieved to produce a more uniformly sized flowable powder. Particles that do not pass through the sieve can be circulated back to the crushing and/or grinding step.

The present invention is not limited to a particular technique for mixing the input materials. In some embodiments, the input materials are mixed to produce a batch mixture by dry stirring, or wet stirring followed by a drying procedure. The methods are not limited to a particular manner of mixing. In some embodiments, input materials are mixed in any type of mixer that will uniformly distribute the components (e.g., pan mixer, conical blender, ribbon mixer, rotating drum mixer, etc.) to yield a batch mixture (e.g., uniform batch mixture, semi-uniform batch mixture). In some embodiments, mixed input materials are sieved through one or more meshes (e.g., 20 mesh, 40 mesh, 60 mesh, 80 mesh, 100 mesh, 150 mesh, 200 mesh, 300 mesh, 400 mesh, etc.), for example, to eliminate any clumps or particulates.

In some embodiments, the input material (e.g., a flux (e.g., hazardous waste glass (e.g., CRT glass)), filler (e.g., alumina), and/or plastic material (e.g., clay)) mixture (e.g., batch mixture) is passed through a mesh (e.g., 10, mesh, 20 mesh, 40 mesh, 60 mesh, 80 mesh, 100 mesh, 150 mesh, 200 mesh, 300 mesh, 400 mesh, etc.) before and/or after mixing with binder (e.g., polyvinyl alcohol or sodium silicate).

The present invention is not limited to a particular technique for pressing the mixed input materials. In some embodiments, pressing is performed in a press (e.g., hydraulic press). The pressing is not limited to a particular degree of pressing. In some embodiments, pressing of the mixed input material is done under at least 50 kg/cm$^{32}$ (e.g., 50 kg/cm$^2$ . . . 100 kg/cm$^2$ . . . 200 kg/cm$^2$ . . . 300 kg/cm$^2$ . . . 400 kg/cm$^2$ . . . 500 kg/cm$^2$ . . . 750 kg/cm$^2$ . . . 1000 kg/cm$^2$ . . . 2000 kg/cm$^2$, etc.). In some embodiments, the mixed input materials are pressed into a desired shape (e.g., a tile) and size (e.g., 1 cm×1 cm, 2 cm×2 cm, 3 cm×6 cm, 8 cm×8 cm, 30 cm×30 cm, etc.). In some embodiments, articles (e.g., tiles) of any size (e.g., 1 inch×1 inch, 2 inch×4 inch, 3 inch×9 inch, 12 inch×12 inch, 24 inch×24 inch, etc.) and shape (e.g., square, triangle, circular, ovular, hexagonal, rectangular, etc.) are produced by pressing the mixed input materials.

In some embodiments, pressing the mixed input material results in formation of a green article (e.g., green material, green product). In some embodiments, the pressed green article is allowed to dry for at least 1 hour (e.g., 1 hour, 2 hours, 4 hours, 12 hours, 24 hours, 2 days, 4 days, 1 week, times therein, etc.). In some embodiments, the pressed green article is dried at room temperature (e.g., approximately 23° C.) and or in an oven (e.g., 25° C. . . . 40° C. . . . 60° C. . . . 80° C. . . . 100° C. . . . 110° C. . . . 150° C. . . . 200° C., etc.).

The present invention is not limited to a particular technique for firing the green article resulting from pressing of the mixed input material. In some embodiments, the green article is fired (e.g., in a kiln, furnace, or oven) at temperatures ranging from 500-2000° C. (e.g., 500° C., 600° C., 700° C., 800° C., 900° C., 1000° C., 1200° C., 1400° C., 1600° C., 1800° C., 2000° C., temperatures therein, etc.). In some embodiments, the green article is fired (e.g., in a kiln, furnace, or oven) at a temperature not exceeding 2000° C. (e.g., <1800° C., <1600° C., <1400° C., <1200° C., <1000° C., <800° C., etc.). In some embodiments, firing is performed on a fast firing schedule (e.g., 45 minutes, 60 minutes 2 hours, etc.) or a slow firing schedule (e.g., 8 hours, 12 hours, 24 hours, etc.). In some embodiments, a green article is fired for at least 15 minutes (e.g., >15 minutes, >30 minutes, >60 minutes, >2 hours, >4 hours, >6 hours, >8 hours, >10 hours, >12 hours, >24 hours, etc.) to yield a ceramic article.

Experiments conducted during the course of developing embodiments for the present invention determined that the required firing temperature to generate a ceramic product is varies inversely with the weight percent of flux material (e.g., hazardous waste glass including, but not limited to, CRT glass, fluorescent light glass, etc.). For example, it was shown that ceramic loaded with up to 70 wt % CRT glass can be produced at around 1000° C. with negligible shrinkage (e.g., <0.5%), warpage or bending. In addition, it was shown that ceramic with a lower loading of CRT glass requires higher firing temperatures for sintering (e.g., up to 1250° C.). Experiments further demonstrated that ceramic with approximately 95% flux material (e.g., hazardous waste glass (e.g., CRT glass, fluorescent light glass, etc.) was fired with a heating rate of 100° C. per hr to 670° C.; ceramic with approximately 92.5% flux material (e.g., hazardous waste glass (e.g., CRT glass, fluorescent light glass, etc.) was fired to approximately 705° C.; ceramic with approximately 85% flux material (e.g., hazardous waste glass (e.g., CRT glass, fluorescent light glass, etc.) was fired to approximately 815° C. Accordingly, it was determined that higher loadings of CRT glass allow for substantially reduced maximum firing temperatures. Indeed, ceramic loaded with 80 and 90% CRT glass reduced the maximum firing temperature to around 830° C. and 700° C., respectively. As such, it was determined that increasing the wt % of hazardous waste glass (e.g., CRT glass, fluorescent light glass, etc.) results in 1) increased recycling efficiency (e.g., amount of waste material recycled per production run), 2) increased amount of toxic metal encapsulation, and 3) decreased energy requirements through reduction of required firing temperature.

The methods of the present invention generate ceramic articles comprising significant quantities of hazardous materials that are safely encapsulated and/or configured to prevent leaching of hazardous materials. In some embodiments, the hazardous materials include, but are not limited to, heavy metals (e.g., mercury, arsenic, cadmium, cobalt, chromium, copper, manganese, nickel, lead, tin, thallium, etc.) and/or toxic metals (e.g., antimony, barium, beryllium, aluminum, cadmium, lead, mercury, osmium, thallium, and vanadium. In some embodiments, the ceramic articles comprise significant quantities of lead (e.g., >0.1%, >0.2%, >0.5%, >1.0%, >2.0%, >5.0%, >10%, >20%, >50%, etc.). In some embodiments, the ceramic articles comprise significant quantities of barium (e.g., >0.1%, >0.2%, >0.5%, >1.0%, >2.0%, >5.0%, >10%, >20%, >50%, etc.). In some embodiments, the ceramic articles comprise significant quantities of cadmium (e.g., >0.1%, >0.2%, >0.5%, >1.0%, >2.0%, >5.0%, >10%, >20%, >50%, etc.). In some embodiments, the ceramic articles comprise significant quantities of mercury (e.g., >0.1%, >0.2%, >0.5%, >1.0%, >2.0%, >5.0%, >10%, >20%, >50%, etc.). In some embodiments, the ceramic articles comprise significant quantities of silver (e.g., >0.1%, >0.2%, >0.5%, >1.0%, >2.0%, >5.0%, >10%, >20%, >50%, etc.). In some embodiments, the ceramic articles comprise significant quantities of selenium (e.g., >0.1%, >0.2%, >0.5%, >1.0%, >2.0%, >5.0%, >10%, >20%, >50%, etc.). The ceramic articles comprising significant quantities of hazardous materials that are safely encapsulated and/or configured to prevent leaching of hazardous materials meet or exceed Environmental Protection Agency (EPA) standards for toxicity and leaching (e.g., leaching of toxic and/or heavy metals). For example, ceramic articles of the present invention meet or exceed Environmental Protection Agency (EPA) standards when subjected to the Toxicity Characteristic Leaching Procedure (TCLP). In some embodiments, ceramic articles of the present invention exhibit TCLP barium leachate concentrations less than 100 ppm (e.g., <50 ppm, <20 ppm, <10 ppm, <5 ppm, etc.). In some embodiments, ceramic articles of the present invention exhibit TCLP lead leachate concentrations less than 5 ppm (e.g., <5 ppm, <4 ppm, <3 ppm, <2 ppm, <1 ppm, <0.5 ppm, <0.1 ppm, etc.). In some embodiments, ceramic articles of the present invention exhibit TCLP cadmium leachate concentrations less than 1 ppm (e.g., <1 ppm, <0.5 ppm, <0.1 ppm, <0.05 ppm, etc.). In some embodiments, ceramic articles of the present invention exhibit TCLP mercury leachate concentrations less than 0.2 ppm (e.g., <0.2 ppm, <0.1 ppm, <0.05 ppm, <0.02 ppm, <0.01 ppm, etc.). In some embodiments, ceramic articles of the present invention exhibit leachate concentrations for all hazardous monitored organic and inorganic analytes (SEE Table 1).

TABLE 1

Maximum Concentration of contaminants for Toxicity Characteristic

| Contaminant | Regulated Level (ppm) |
| --- | --- |
| Arsenic (As) | 5.0 |
| Barium (Ba) | 100 |
| Benzene | 0.5 |
| Cadmium (Cd) | 1.0 |
| Carbon Tetrachloride | 0.5 |
| Chlordane | 0.03 |
| Chlorobenzene | 100 |
| Chloroform | 6.0 |
| Chromium (Cr) | 5.0 |
| o-Cresol | 200 |
| m-Cresol | 200 |
| p-Cresol | 200 |
| Cresol | 200 |
| 2,4-Dichlorophenoxyacetic acid | 10.0 |

TABLE 1-continued

Maximum Concentration of contaminants for Toxicity Characteristic

| Contaminant | Regulated Level (ppm) |
| --- | --- |
| 1,4-Dichlorobenzene | 7.5 |
| 1,2-Dichloroethane | 0.5 |
| 1,1-Dichloroethylene | 0.7 |
| 2,4-Dinitrotoluene | 0.13 |
| Endrin | 0.02 |
| Heptachlor | 0.008 |
| Hexachlorobenzene | 0.13 |
| Hexachlorobutadiene | 0.5 |
| Hexachloroethane | 3.0 |
| Lead (Pb) | 5.0 |
| Lindane | 0.4 |
| Mercury (Hg) | 0.2 |
| Methoxychlor | 10.0 |
| Methyl ethyl ketone | 200 |
| Nitrobenzene | 2.0 |
| Pentachlorophenol | 100 |
| Pyridine | 5.0 |
| Selenium (Se) | 1.0 |
| Silver (Ag) | 5.0 |
| Tetrachloroethylene | 0.7 |
| Toxaphene | 0.5 |
| Trichloroethylene | 0.5 |
| 2,4,5-Trichlorophenol | 400 |
| 2,4,6-Trichlorophenol | 2.0 |
| 2,4,5-TP (Silvex) | 1.0 |
| Vinyl Chloride | 0.2 |

In some embodiments, ceramic articles of the present invention exhibit structural characteristics on par with, or superior to, similar conventional articles (i.e. not manufactured from hazardous waste glass and/or by the methods of the present invention). In some embodiments, ceramic articles of the present invention exhibit thermal shock resistance comparable to similar conventional ceramic articles, do not exhibit warpage or exhibit negligible warpage (e.g., <5%, <2%, <1%, <0.5%, <0.1%). In some embodiments, ceramic articles of the present invention exhibit breaking strengths comparable to similar conventional ceramic articles. In some embodiments, ceramic articles of the present invention exhibit breaking strengths superior to similar conventional ceramic articles. In some embodiments, ceramic articles of the present invention exhibit high chemical resistance. In some embodiments, ceramic articles of the present invention are highly resistant to freeze damage. In some embodiments, ceramic articles of the present invention are highly resistant to abrasion. In some embodiments, ceramic articles of the present invention are highly resistant to staining. In some embodiments, ceramic articles of the present invention are highly resistant to color fading. In some embodiments, ceramic articles of the present invention are highly resistant to loss of texture and/or texture fading.

In some embodiments, methods of the present invention find utility with other conventional ceramic production (e.g., ceramic tile production) procedures (e.g., single firing, double firing, glazing, etc.). In some embodiments, methods of the present invention are used with methods for providing decoration to ceramic articles (e.g., glazing, coloring, patterning, etc.).

EXPERIMENTAL

Example 1

Scheme 1 Conventional Processing

Preparation of Ceramic Tiles by Conventional Ceramic Processing Techniques and the desired properties of such tiles are described in the American National Standard Specifications for Ceramic Tiles (ANSI A137.1), published by the Tile Council of America (TCA). Tiles can be glazed or unglazed, and the performance requirements vary depending upon the application. In conventional tile compositions the ratio of flux:filler:plastic is generally 20:20:60. Experiments were performed during development of embodiments of the present invention to establish compositions and methods to produce a ceramic product using CRT glass primarily as a fluxing material. CRT glass begins to flow at a relatively low temperature (around the glass transition point) and is of comparable composition to that of the natural fluxing mineral feldspar (SEE Table 2).

TABLE 2

Chemical Composition of Feldspar and CRT Glass (wt %).

| Oxide | Feldspar | CRT glass |
| --- | --- | --- |
| $SiO_2$ | 67.97 | 61.29 |
| BaO | 0.133 | 10.7 |
| $Na_2O$ | 7.39 | 8.92 |
| $K_2O$ | 4.74 | 7.47 |
| PbO | 0 | 5.05 |
| SrO | 0.042 | 2.4 |
| $Al_2O_3$ | 18.27 | 2.08 |
| CaO | 1.4 | 0.65 |
| $ZrO_2$ | 0 | 0.43 |
| $Sb_2O_3$ | 0 | 0.33 |
| F | 0 | 0.3 |
| $CeO_2$ | 0 | 0.16 |
| $Fe_2O_3$ | 0 | 0.15 |
| MgO | 0 | 0.14 |
| $TiO_2$ | 0 | 0.11 |
| ZnO | 0.001 | 0.1 |
| CuO | 0 | 0.01 |

However, adherence to the typical 20-25% limit for fluxing material would likely produce inefficient (e.g., economically inefficient, environmentally inefficient, etc.) CRT loadings. Experiments were performed during development of embodiments of the present invention to determine the maximum achievable waste loading in the CRT-based ceramic tile, based on modifications of the standard tile manufacturing methods.

The properties of the fired ceramic tile body were examined as functions of waste loading (e.g., 40 to 80 wt % of CRT glass) and firing schedule (e.g., different maximum temperature (e.g., 650° C. to 1250° C.), different time durations at maximum temperature). Clay was selected as the plastic material and alumina was used as the filler, in addition to the CRT glass. The weighed ingredients were mixed by wet stirring and dried in an oven at 110° C. The dried batch was sieved through 100 mesh, then sieved through 20 mesh after being mixed with the binder material. The resulting material was pressed into a 2"×2" tile in a uniaxial press at 400 kg/cm² pressure. After pressing, tiles were dried in an oven at 110° C. for at least 48 hours. The tiles were then fired at different temperatures, ranging from 650-1250° C. with two hours soaking, depending on the compositions (SEE FIG. 1). The firing of the tiles was done using slow or fast schedules. The ingredients of the CRT-based tiles are summarized in Table 3. Coloring agents were added to selected tiles to produce single-fired colored tiles.

TABLE 3

Batch Composition of Tile Body Utilizing CRT Glass (wt %).

| CRT glass powder | 40 | 50 | 60 | 70 | 80 |
|---|---|---|---|---|---|
| Filler (alumina) | 30-40 | 20-30 | 20-25 | 15-20 | 5-10 |
| Kaolin and Ball clay | 15-20 | 20-25 | 15-20 | 10-15 | 10-15 |

Figure 2:
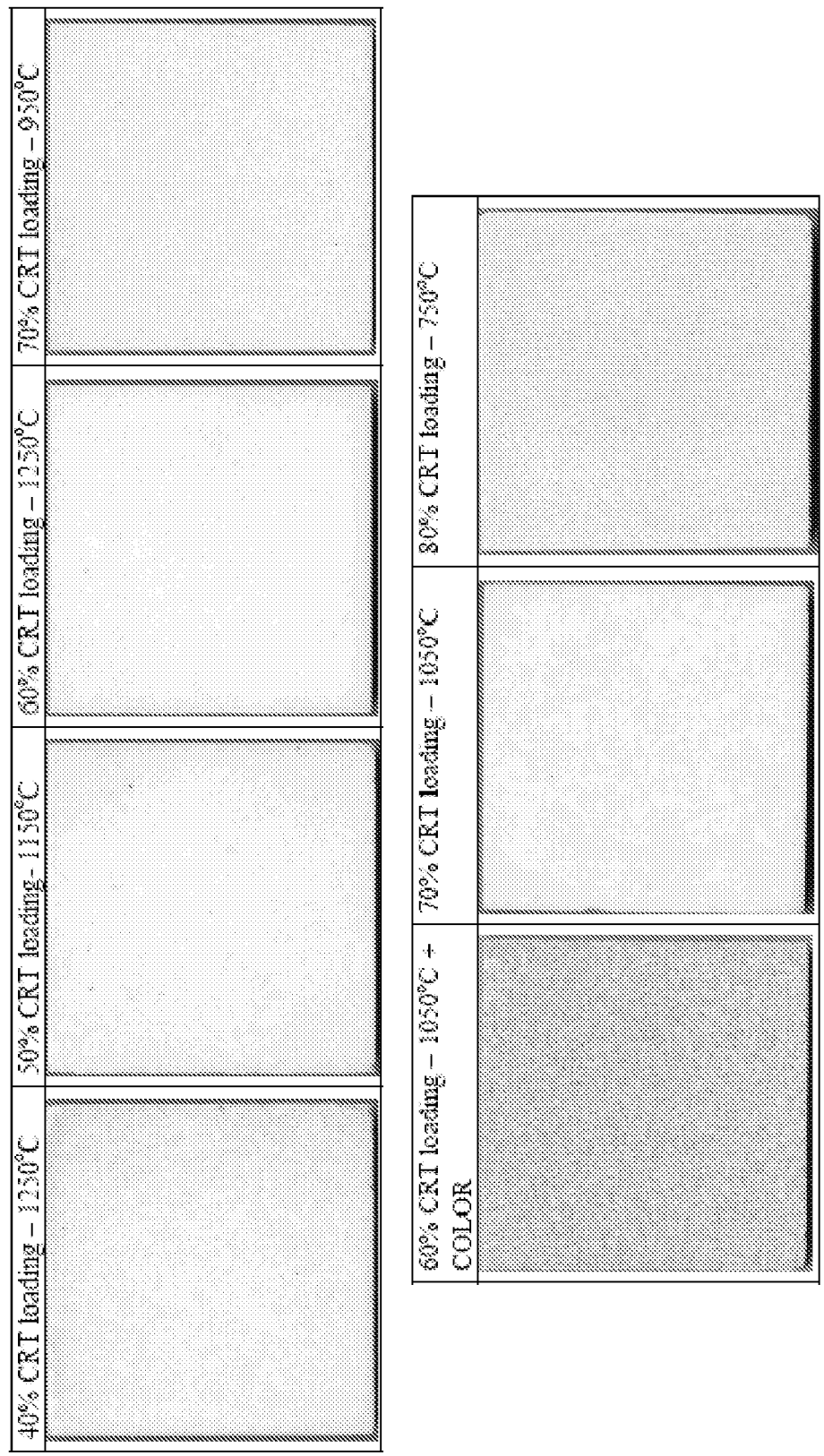
FIG. 2 shows images of fired tiles made from CRT glass

The overall appearance of the fired ceramic tiles is demonstrated by the scanned images shown in FIG. 2, which were obtained using an optical scanner. Crystalline phase identification analysis by X-ray diffraction (XRD) was performed on powdered samples of the fired tiles. Microstructures were examined using scanning electron microscopy coupled with energy dispersive x-ray spectroscopy (SEM/EDS). Water absorption was measured using the American Society for Testing and Materials (ASTM) procedure [7]. The toxicity characteristic leaching procedure (TCLP) response of the fired tile was also measured following the US EPA Method 1311 protocol.

Experiments conducted during development of embodiments of the present invention demonstrated that ceramic tiles of good quality can be made following the standard tile industrial method while incorporating very high percentages of CRT glass (SEE Table 4).

TABLE 4

Observed Fired Properties of Ceramic Tiles Made from CRT Glass.

| Tile name | T12 | T16 | T18 | T19 | T20 | T22 |
|---|---|---|---|---|---|---|
| CRT loading | 40% | 50% | 60% | 70% | 80% | 90% |
| Temperature tested for sintering, ° C. | 1150-1250 | 1150-1250 | 1050-1250 | 900-1030 | <830 | <750 |
| Shrinkage, % | No shrinkage | No shrinkage | No shrinkage | No shrinkage | ~4 | ~4 |
| Warpage | No warpage | No warpage | No warpage | No warpage | Bending observed | Bending observed |
| Water absorption. % | 3 (for 1250° C.) | 7 (for 1150° C.) | 4 (for 1250° C.) | 0.2 (for 950° C.) | Not done | Not done |
| Structure | Porous | Porous | Porous | Semivitreous | Semivitreous | Semivitreous |

A ceramic tile loaded with as high as 70 wt % CRT glass can be produced at around 1000° C. following a fast firing schedule with negligible shrinkage (<0.5%) and warpage or bending. The tiles with a lower loading of CRT glass required higher temperatures for sintering, up to 1250° C. Higher loadings of CRT glass reduced the maximum firing temperature substantially. Tiles loaded with 80 and 90% CRT glass further reduced the maximum firing temperature to around 830 and 700° C., respectively. However, at 80-90% loading, shrinkage and bending became noticeable for the test samples. CRT glass produced ceramic tile with a brilliant off-white color after firing and minimum dimensional shrinkage and warpage for wide ranges of glass loading (SEE FIG. 2). The distinctive brilliant whitish color of the CRT tile makes it very amenable to attractive coloration for decoration purposes. Dimensional stability is very important for wall tiles, for which there is only 1% shrinkage tolerance, and floor tiles which have a maximum 3-4% shrinkage tolerance. Visual inspection of the CRT tiles generally reported highly desirable brilliant off-white color with virtually zero shrinkage and warpage. The color of the tiles varies with loading of CRT glass along with firing temperature in some cases. The corners of the tiles were found to be very sharp. Empirical chipping and impacting tests indicated that the tiles were very hard and would exhibit good flexural strength. CRT tiles of a wide range of compositions all showed exceptional to acceptable water absorption (See Table 5).

TABLE 5

Water Absorption Results for Tiles made from CRT Glass.

| Water absorption. % | 40% loading | 50% loading | 60% loading | 70% loading |
|---|---|---|---|---|
| 1250° C. | 3% | Not done | 4% | Not done |
| 1150° C. | Not done | 7% | Not done | Not done |
| 1050° C. | Not done | Not done | Not done | 0% |
| 950° C. | Not done | Not done | Not done | 0.20% |

Figure 3:
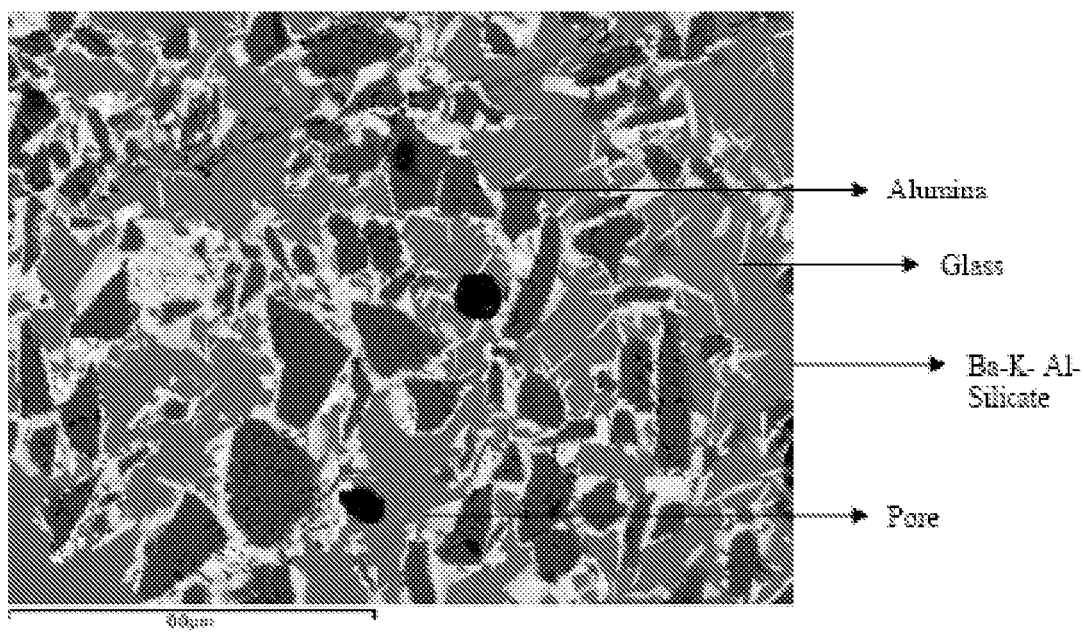
FIG. 3 shows backscattered SEM images of sintered ceramic tile from CRT glass: (a) 40 wt % loading, (b) 60 wt % loading. The microstructure shows the uniform distribution of filler minerals; needle-shaped high-barium aluminosilicate phases have been formed surrounding the filler giving a porphyritic texture. The concentration of filler minerals is reduced by the higher loading, and a second phase is being developed surrounding the filler. This acicular type of phase would form a netlike structure inside the tile body, which enhances strength.
Figure 3:
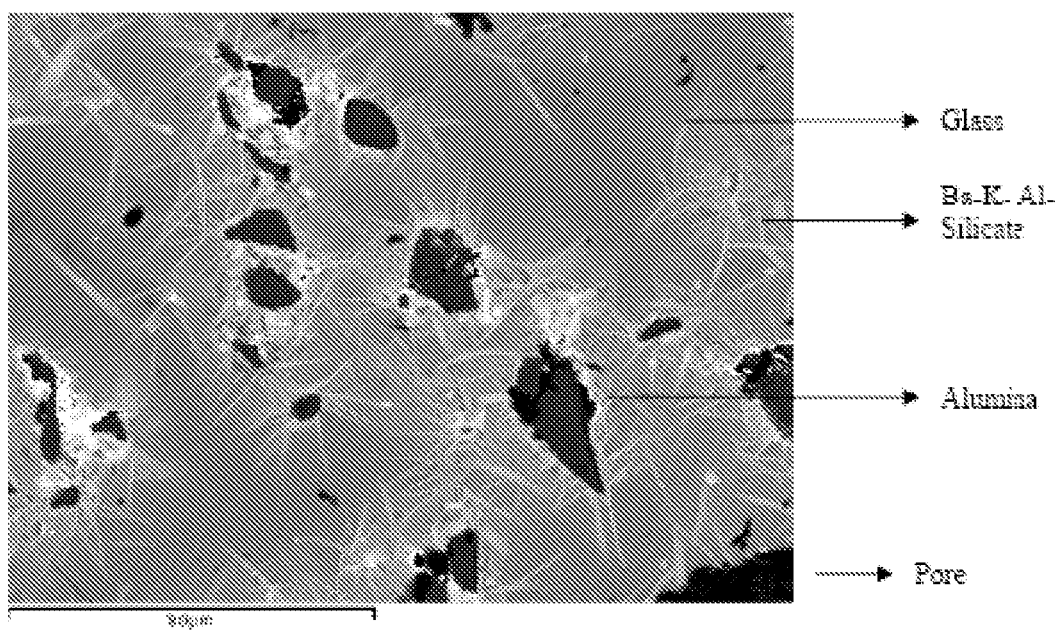
Figure 4:
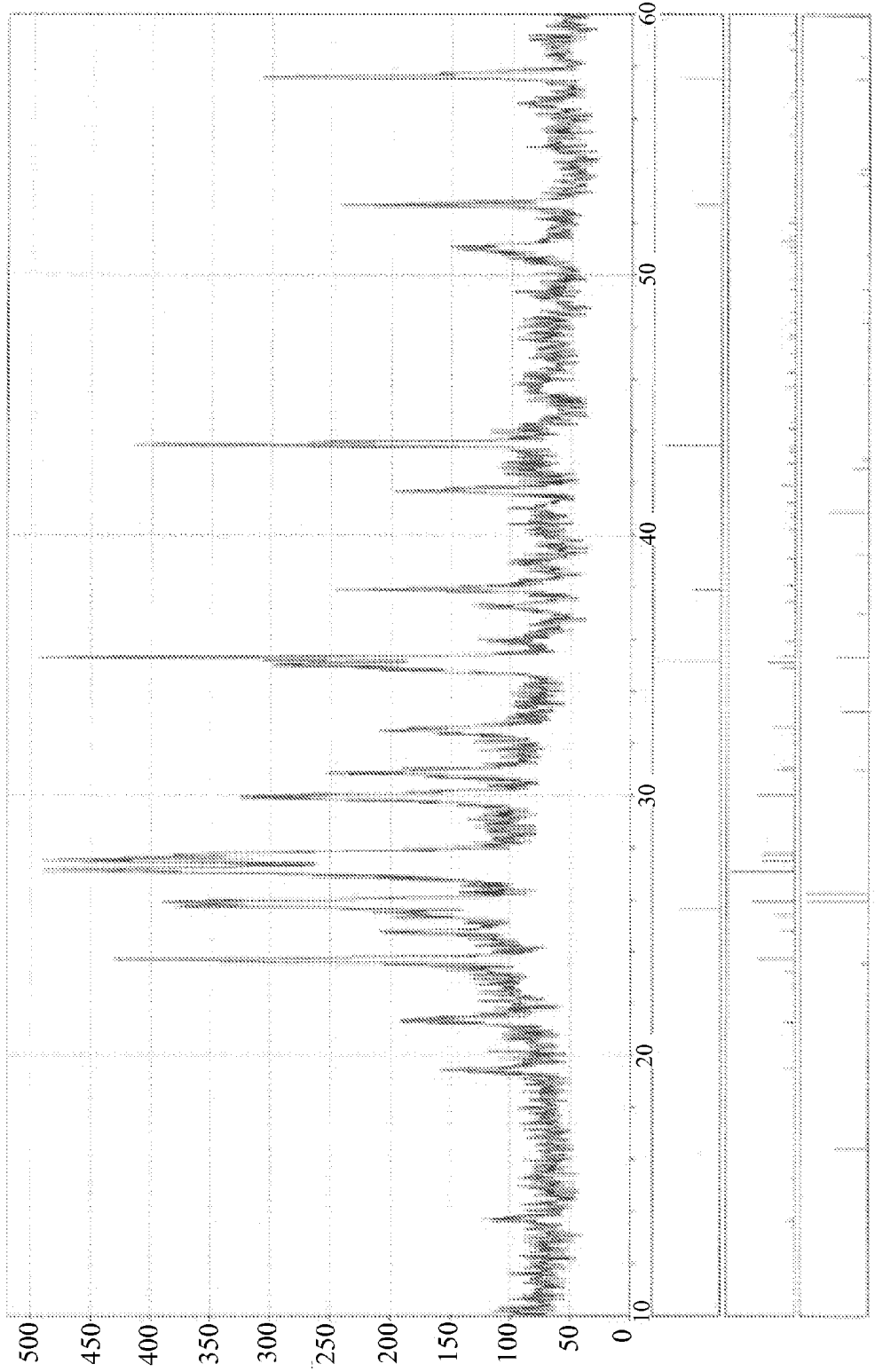
FIG. 4 shows XRD pattern identifying phases present in fired tiles.

The microstructures of selected tile samples were examined by SEM. The results show a porous texture. With increasing glass content, the vitreous phase fraction tends to increase, which in turn results in a denser and less porous ceramic body. Most pores, as shown by optical microscopy and SEM, were closed in nature and the shapes of the pores were nearly round. The higher magnification SEM images show development of some needle-shaped crystalline phases surrounding the filler materials, which appeared to have grown at the expense of the vitreous phase (SEE FIG. 3). EDS analysis of the acicular phases indicate the presence of high contents of barium, potassium, aluminum, and silicon, suggesting an aluminosilicate phase resembling barium-bearing feldspar. Indeed, the XRD powder patterns of the same tile sample, with 60 wt % CRT, identify two major crystalline phases, corundum and hyalophane, and minor amounts of mullite (SEE FIG. 4). Hyalophane is a potassium-barium aluminosilicate that tends to be needle-like.

The TCLP leach test was performed on tiles with 40 wt % CRT loading. The results showed TCLP leachate concentrations of 1.29 ppm for Ba and 0.38 ppm for Pb (SEE Table 6); these are well below the EPA TCLP limits of 100 ppm and 5 ppm, respectively.

TABLE 6

Results of TCLP Testing Tiles Made from CRT Glass.

| Sample | Ba (ppm) | Pb (ppm) | Sr (ppm) |
|---|---|---|---|
| T12 (40% CRT) | 1.29 | 0.38 | 0.22 |

Example 2

Scheme 2 Powder-Sintering

Ceramic tiles were prepared using high CRT glass loadings of 85-95 wt % by sintering the powdered waste glass with $Al_2O_3$ as a filler material. This technique is referred to as the "powder-sintering" method of tile processing. Ground CRT waste glass was mixed with 5-15% alumina and dry-pressed with the addition of polyvinyl alcohol as a binder for improving green strength. Both CRT waste glass and alumina are highly nonplastic. Addition of water to the powdered batch was avoided, therefore the drying operation was not required. Fully sintered and dense tiles were obtained after firing at relatively low temperatures in the range 650-815° C.

Synthesized CRT glass of the average composition shown in Table 1 was used for ceramic tile production. In addition, funnel, faceplate, and neck glasses from an actual CRT [5] were utilized in some tile preparations. The CRT glass was broken with a hammer and then ground using mortar and pestle until the material passed a 200-mesh sieve. The composition of the glass mixture as determined by XRF is given in Table 7.

TABLE 1

Reference Average CRT Glass Composition (Target) [6] and XRF Analysis of Synthesized Material Used in This Work (wt %).

| Oxide | Target | XRF |
|---|---|---|
| $SiO_2$ | 60.92 | 61.29 |
| BaO | 10.8 | 10.7 |
| $Na_2O$ | 8.96 | 8.92 |
| $K_2O$ | 7.44 | 7.47 |
| PbO | 5.02 | 5.05 |
| SrO | 2.39 | 2.4 |
| $Al_2O_3$ | 2.07 | 2.08 |
| CaO | 0.67 | 0.65 |
| $ZrO_2$ | 0.43 | 0.43 |
| $Sb_2O_3$ | 0.33 | 0.33 |
| F | 0.3 | 0.3 |
| $CeO_2$ | 0.16 | 0.16 |
| $Fe_2O_3$ | 0.15 | 0.15 |
| MgO | 0.14 | 0.14 |
| $TiO_2$ | 0.11 | 0.11 |
| ZnO | 0.1 | 0.1 |
| CuO | 0.01 | 0.01 |

TABLE 7

CRT Glass Composition.

| Oxide | Wt % |
|---|---|
| $SiO_2$ | 57.57 |
| $Na_2O$ | 8.01 |
| BaO | 7.49 |
| $K_2O$ | 7.33 |
| SrO | 7.33 |
| PbO | 4.69 |
| $Al_2O_3$ | 2 |
| CaO | 1.87 |
| $ZrO_2$ | 1.69 |
| MgO | 0.76 |
| $TiO_2$ | 0.36 |
| $Sb_2O_3$ | 0.36 |
| $CeO_2$ | 0.3 |
| $Fe_2O_3$ | 0.06 |
| $SO_3$ | 0.04 |
| $HfO_2$ | 0.04 |
| $IrO_2$ | 0.03 |
| ZnO | 0.02 |
| $Pr_5O_{11}$ | 0.01 |
| $O_5O_4$ | 0.0114 |
| $SnO_2$ | 0.0056 |
| CuO | 0.0052 |
| $Cr_2O_3$ | 0.0043 |
| NiO | 0.0041 |
| $Rb_2O$ | 0.0035 |

Alumina was added in the appropriate amount and mixed, first by shaking the blend in a plastic container, followed by mechanical mixing in a high-speed blender. Polyvinyl alcohol (1 wt %) was added to the mixed powder as a binder. The mixture was then placed in a 10-MT hydraulic press to form the green tile. The green tile samples were fired in a furnace with a heating rate of 100° C. per hr to 670° C. for the 5% alumina sample; 705° C. for the 7.5% alumina sample; and 815° C. for the 15% alumina sample.

Tiles were made via the powder-pressing method with alumina concentrations between 5 and 15 wt %. Samples were subjected to TCLP leach testing. Tiles made with 5 wt % and 7.5 wt % alumina gave TCLP barium leachate concentrations of 5.17 ppm and 5.86 ppm, respectively, and lead leachate concentrations of 3.45 and 3.69 ppm, respectively. These values are below the EPA TCLP limits of 100 ppm and 5 ppm, respectively. Improvements in TCLP leachability are possible by optimizing the CRT waste loadings and additives.

Figure 5A:
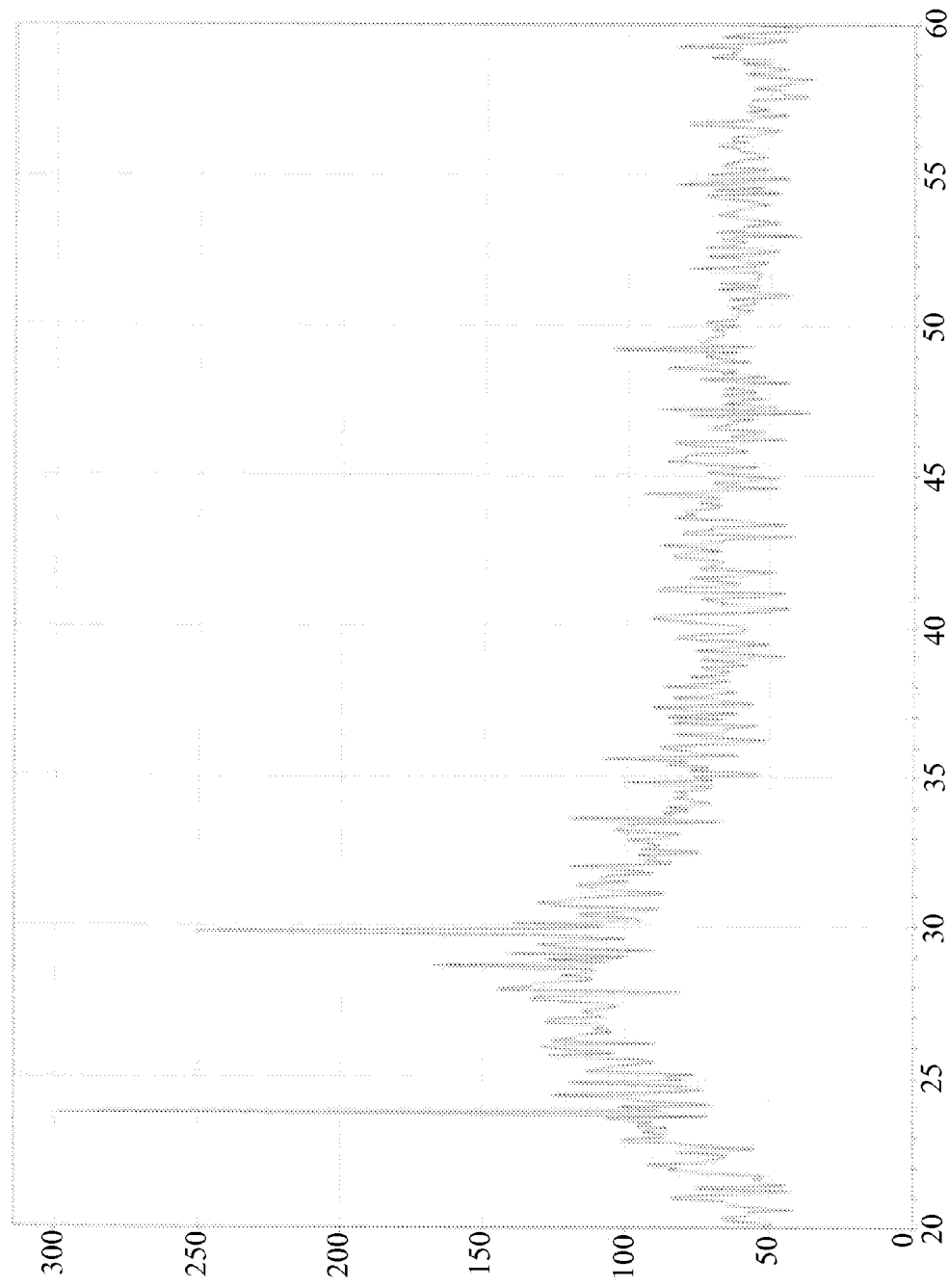
FIG. 5A shows XRD patterns of tiles made from CRT glass before firing.
Figure 5B:
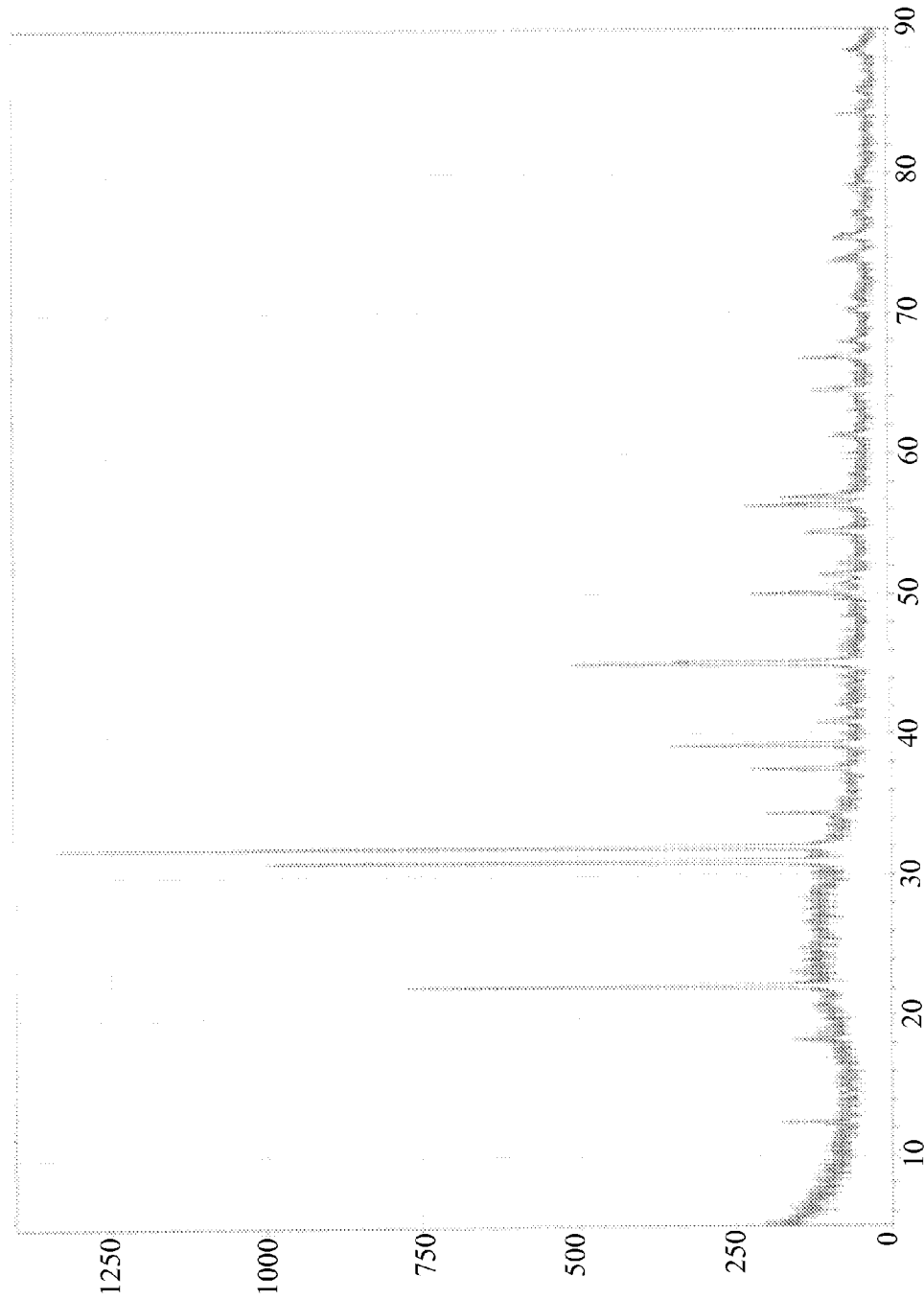
FIG. 5B shows XRD patterns of tiles made from CRT glass after firing.
Figure 6:
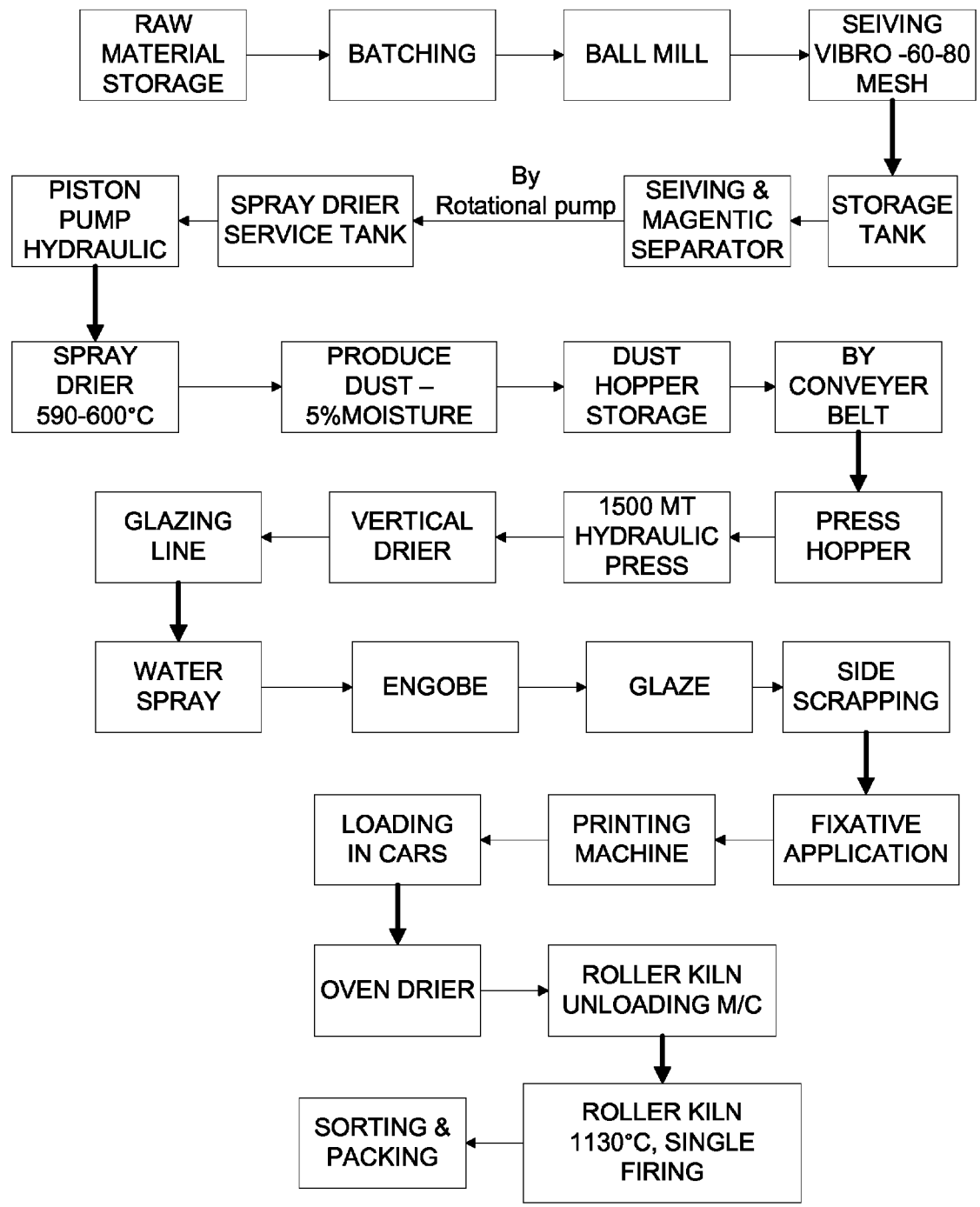
FIG. 6 shows a flow chart for the production-scale fabrication of single-fired wall tile.
Figure 7:
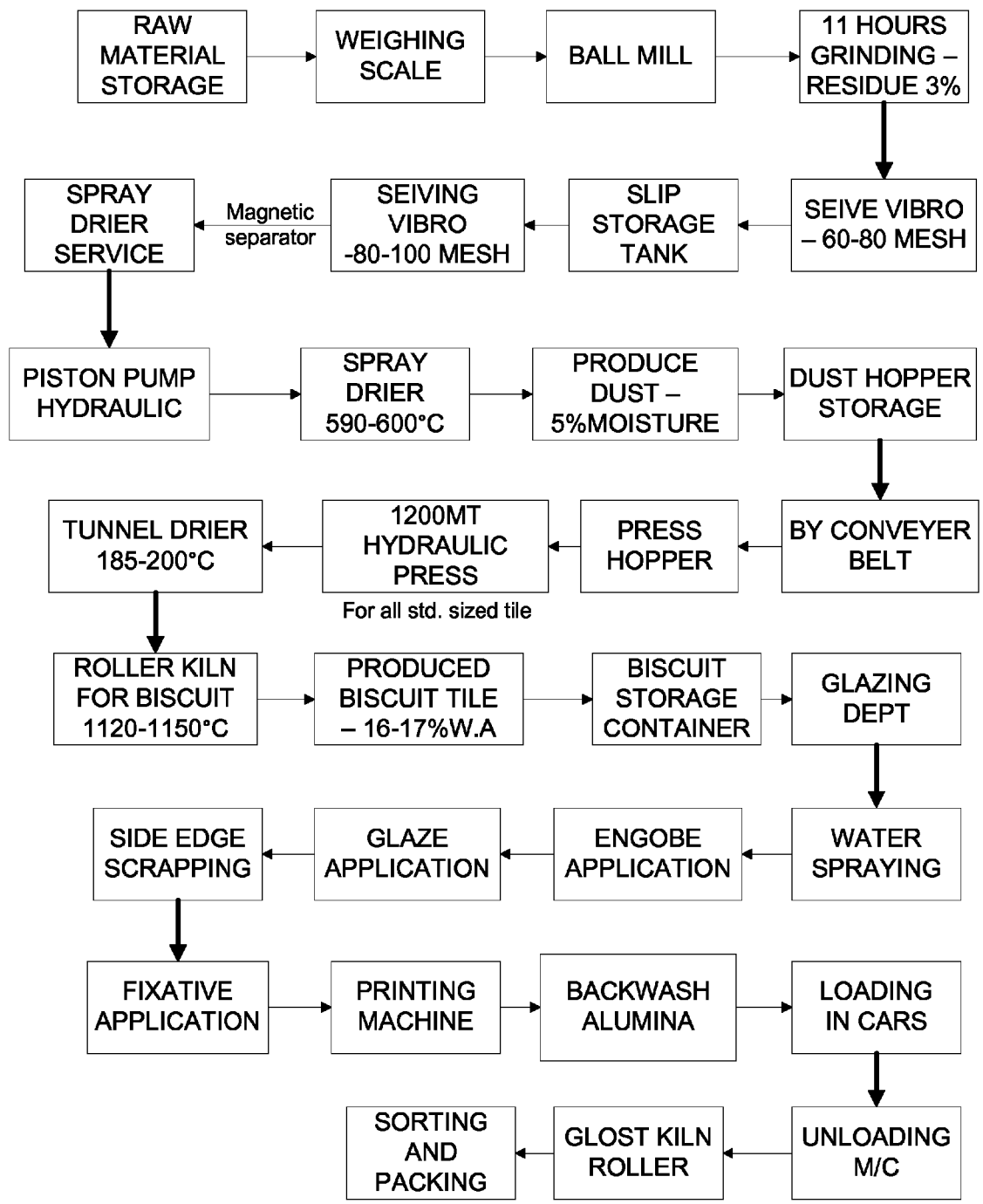
FIG. 7 shows a flow chart for the production-scale fabrication of double-fired wall tile.

The principal crystalline phase identified in the samples by XRD was Na-Kanorthite. However, the XRD patterns also indicate the presence of a substantial fraction of glassy phase in the tiles (SEE FIG. 5).

Ceramic containing 15 wt % alumina is much lighter in color than samples with lower alumina content. All samples were able to be polished to a very glossy finish on account of the high glass content in these tiles. The finish was achieved without glaze coating.

The waste-tiles prepared by the powder-processing method are strong and tough compared to the tiles currently marketed. The large fraction of glassy phase resulted in minimal porosity. Tiles can be produced by this route in almost any dimension and color.

The overall economic feasibility of processing CRT glass wastes, into tiles by the powder-processing method (e.g., mixing with a modest amount of a filler compound (e.g., alumina) and firing the green tiles at moderate temperatures) is both more economically attractive and technologically simpler than the traditional ceramic or glass-ceramic routes. The filler material can alternatively be from a range of waste products from the ceramic/refractories industries, such as fired refractory and pottery wastes (grog) of almost any composition, instead of alumina. The disposal of fired ceramic wastes is often a problem for these industries. Accordingly, the filler grog may be procured cheaply or may even with compensation. Conventional tile manufacturing necessitates the sintering temperature to be around 1250-1400° C. At such high temperatures, a reduction of sintering temperature by 100° C. reduces the energy cost by almost 50%. The energy savings between firing ceramic bodies at 1350° C. and 815° C. is conservatively estimated at 65% if the low temperature route is adopted. Considering that almost 50% of the processing cost in ceramic industries comprises energy expenditures, this could represent a further competitive edge for CRT tiles. In the powder processing method, several unit operations such as crushing, grinding, and sieving/grading of clay, quartz, and feldspar will be avoided. Crushing and grinding hard minerals such as quartz and feldspar are the second most energy-intensive operations in the ceramic industry. In the powder sintering route, these operations will be substituted by crushing/grinding grog, which will compose only 5-15% of the final product as compared to 40-60% for the traditional ceramic processing route. This will save, for example, an additional 10% of the energy usage. Slip preparation will not be required in this process. It is estimated that an additional 10-15% savings in energy could be realized by avoiding this operation. The savings in man-power requirements by avoiding the traditional unit operations used in conventional tile manufacturing could be as much as, for example, 50%.

The results obtained in experiments conducted during development of the present invention demonstrate that high loadings of CRT waste glass can be used in the fabrication of ceramic tiles using a relatively simple dry pressing and low-temperature sintering method. This process utilizes the favorable amorphous (glassy) properties of the CRT waste glasses to reduce processing costs apparently without compromising any of the vital characteristics required of a wall or floor tile.

Example 3

Scheme 3 Glass Ceramic

Glass-ceramic processing was conducted by first melting simulated CRT waste glass with additives consisting of 2-10 wt % $P_2O_5$ and $TiO_2$. $P_2O_5$ and $TiO_2$ are known nucleating agents and are added to glass batches during the processing of glass-ceramic products. Typical glass batches containing the two additives had high melting temperatures (1550° C.) and the melt exhibited very poor flow properties. However, the glasses crystallized fairly homogeneously at nucleation and growth temperatures in the range of 700-850° C. Relatively tough glass-ceramic tiles were prepared by this method.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

REFERENCES

[1] "State of the U.S. Ceramic Tile Industry (Fall 2001)," presented by Robert E. Daniels, published in newsletter of The Tile Council of America; herein incorporated by reference in its entirety.
[2] "Testing of Recycled Glass and Inorganic Binder Paving Tiles—Final Report," (Report no. GL-99-2), University of Washington, May 1999; herein incorporated by reference in its entirety.
[3] "Creating Markets for Recycled Resources—Materials Recovery from Waste Cathode Ray Tubes (Project Code GLA15-006)," written by ICER (Industry Council for Electronic Equipment Recycling), published by The Waste & Resources Action Programme, November 2003; herein incorporated by reference in its entirety.
[4] "Potential Markets for CRTs and Plastics from Electronics Demanufacturing: An Initial Scoping Report—Technical Report #6," Chelsea Center for Recycling and Economic Development, University of Massachusetts, August 1998, Chelsea, Mass.; herein incorporated by reference in its entirety.
[5] "Analysis and Leach Testing of CRT Glasses," R. K. Mohr and I. L. Pegg, VSL-04R4390-1, Rev. 0, Vitreous State Laboratory, The Catholic University of America, Washington, D.C., May 25, 2004; herein incorporated by reference in its entirety.
[6] "GW-12.10-130: New Approach to Cathode Ray Tube (CRT) Recycling," Industry Council for Electronic Equipment Recycling, Prepared for the Department of Trade and Industry, (UK) August 2003; herein incorporated by reference in its entirety.
[7] "Standard Test Method for Water Absorption, Bulk Density, Apparent Porosity and Apparent Specific Gravity of Fired Whiteware Products," ASTM C373-88 (reapproved 1999); herein incorporated by reference in its entirety.
[8] "Characterization of Lead Leachability from Cathode Ray Tubes Using the Toxicity Characteristic Leaching Procedure," T. G. Townsend, S. Musson, Yong-Chul Jang, Il-Hyun Chung, Report to Florida Center for Solid and Hazardous Waste Management, State University System of Florida, Gainesville, Fla., December 1999; herein incorporated by reference in its entirety.
[9] "Fabrication of Ceramic Tiles from Waste CRT Glass," M. Chaudhuri, B. Dutta, T. Barnard, H Gan, and I. Pegg, VSL-05R5390-1, Rev. 0, Vitreous State Laboratory, The Catholic University of America, Washington, D.C., Jan. 18, 2005; herein incorporated by reference in its entirety.

We claim:

1. A method of producing a ceramic article from hazardous waste glass comprising:
   mixing hazardous waste glass with a filler and a non-aqueous binder, wherein the hazardous waste glass comprises barium and lead, and further wherein the filler is 5-15% of the mixture by weight and the hazardous waste glass is 85-95% of the mixture by weight;
   pressing the mixture to produce a green article; and
   firing said green article to produce a ceramic article, wherein the ceramic article exhibits lead leachate concentrations of less than 5 ppm and exhibits barium leachate concentrations of less than 100 ppm, and wherein the firing comprises heating the green article to a maximum firing temperature between about 650° C. and 705° C.

2. The method of claim 1, wherein the hazardous waste glass comprises one or more of the following characteristics: greater than 1% lead by weight, greater than 5% lead by weight, greater than 20% lead by weight, CRT glass, fluorescent light glass, greater than 1% barium by weight, greater than 5% barium by weight, and greater than 20% barium by weight.

3. The method of claim 2, wherein the filler is at least one of alumina, magnesium silicate, and bentonite.

4. The method of claim 1, wherein the non-aqueous binder is at least one of polyvinyl alcohol and sodium silicate.

5. The method of claim 1, wherein pressing is at least one of dry pressing, placing the mixture under pressure of at least 200 kg/cm², and placing the mixture under pressure of about 400 kg/cm².

6. The method of claim 1, wherein the ceramic article exhibits barium leachate concentrations of less than 10 ppm.

7. The method of claim 1, wherein the filler is 5-7.5% of the mixture by weight.

8. A method of producing a ceramic article from hazardous waste glass comprising:
   mixing hazardous waste glass with a filler and a plastic material, wherein the hazardous waste glass comprises barium and lead, and further wherein the hazardous waste glass is 65-75% of the mixture by weight, the filler is 15-20% of the mixture by weight, and the plastic material is 10-15% of the mixture by weight;
   mixing the hazardous waste Mass, the filler, and the plastic material mixture with a non-aqueous binder to produce a batch mixture;
   pressing the batch mixture to produce a green article;
   drying the green article; and
   firing the green article to produce a ceramic article, wherein the ceramic article exhibits lead leachate concentrations of less than 5 ppm and exhibits barium leachate concentrations of less than 100 ppm.

9. The method of claim 8, wherein the hazardous waste glass comprises one or more of the following characteristics: greater than 1% lead by weight, greater than 5% lead by weight, greater than 20% lead by weight, CRT glass, fluorescent light glass, greater than 1% barium by weight, greater than 5% barium by weight, and greater than 20% barium by weight.

10. The method of claim 8, wherein (i) the filler is at least one of alumina, magnesium silicate, and bentonite; (ii) wherein the plastic material comprises clay; and (iii) wherein the non-aqueous binder is selected from the group consisting of polyvinyl alcohol and sodium silicate.

11. The method of claim 8, wherein mixing the hazardous waste glass with the filler and the plastic material comprises wet stirring followed by drying.

12. The method of claim 8, wherein pressing is at least one of dry pressing, placing the mixture under pressure of at least 200 kg/cm², and placing the mixture under pressure of about 400 kg/cm².

13. The method of claim 8, wherein the firing comprises heating the green article to a maximum firing temperature between about 650° C. and 1250° C.

14. The method of claim 8, further comprising the steps of:
   sieving the hazardous waste glass, the filler, and the plastic material mixture through a first mesh, wherein the first mesh comprises a 50-150 mesh; and
   sieving the batch mixture through a second mesh, wherein the second mesh comprises a 10-40 mesh.

15. The method of claim 8, wherein the ceramic article exhibits barium leachate concentrations of less than 10 ppm.

16. The method of claim 8, wherein firing comprises heating the green article to a maximum firing temperature between about 900° C. and 1050° C.

17. The method of claim 16, wherein the ceramic article has a water absorption percentage of about 0.2% or less.

* * * * *